United States Patent [19]

Lindenmeier et al.

[11] Patent Number: 4,914,446
[45] Date of Patent: Apr. 3, 1990

[54] DIVERSITY ANTENNA SYSTEM

[76] Inventors: Heinz Lindenmeier, Fuerstenriederstr. 7, 8033 Planegg; Gerhard Flachenecker, Bozenerstrasse 2, 8012 Ottobrunn; Jochen Hopf, Salmdorfstrasse 3a, 8013 Haar; Leopold Reiter, Ludwig-Thomastrasse 9, 8031 Gilching, all of Fed. Rep. of Germany

[21] Appl. No.: 162,402
[22] PCT Filed: Jun. 5, 1987
[86] PCT No.: PCT/EP87/00297
§ 371 Date: Feb. 12, 1988
§ 102(e) Date: Feb. 12, 1988
[87] PCT Pub. No.: WO87/07770
PCT Pub. Date: Dec. 17, 1987

[30] Foreign Application Priority Data

Jun. 12, 1986 [DE] Fed. Rep. of Germany ....... 3618452

[51] Int. Cl.$^4$ .............................................. H01Q 1/02
[52] U.S. Cl. ...................... 343/704; 343/712
[58] Field of Search ............... 343/704, 711, 712, 713; 219/203, 522

[56] References Cited

U.S. PATENT DOCUMENTS

| | | | |
|---|---|---|---|
| 3,832,527 | 8/1974 | Nagasima | 219/203 |
| 4,086,594 | 4/1978 | Kropielnicki et al. | 343/704 |
| 4,439,771 | 3/1984 | Kume et al. | 343/704 |
| 4,583,097 | 4/1986 | Kropielnicki | 343/704 |
| 4,703,328 | 10/1987 | Jone et al. | 343/704 |

FOREIGN PATENT DOCUMENTS

0155647  9/1985  European Pat. Off. ............ 343/713

Primary Examiner—William L. Sikes
Assistant Examiner—Robert E. Wise
Attorney, Agent, or Firm—Michael J. Striker

[57] ABSTRACT

This invention refers to a diversity antenna system for use in a motor vehicle with at least two diversity antennas as well as a window-mounted heater structure consisting of lateral conductors (bus bars) supplying the heater current and heater sections in between. The configuration is such that each diversity antenna has lateral bus bars (4a, 4d; 4b, 4c) and heater sections (2a, 2b) between them as well as a pair of terminals connected to a feeder network (8a, 8b) of the diversity antenna. Each pair of terminals has a ground connection point (14a, 14b) and a tap point on a bus bar (5a, 5b). The tap points on the bus bars (5a, 5b) of the diversity antennas are located such that they are essentially isolated from each other with respect to radio frequencies. The power leads to the bus bars are provided with RF traps (6a through 6d). This serves to optimize the mean signal quality yielded by each individual antenna and to minimize the coincidence of interference in the signals coming from the antennas.

31 Claims, 8 Drawing Sheets

DIVERSITY ANTENNA SYSTEM

BACKGROUND OF THE INVENTION

The invention is a diversity antenna arrangement. Diversity antenna systems are used for receiving frequency-modulated signals preferably in the metric waveband.

An antenna diversity system destined to yield substantial improvements in signal quality for FM radio reception on motor vehicles requires at least two antennas.

On account of engineering and design aspects, it is preferable that these antennas be shaped to integrate into the body of the motor vehicle. This is best achieved by using one of the vehicle's windows as the antenna location. Besides the windshield, which is in many cases the most unfavourable antenna location due to the serious amount of electromagnetic interference caused by the engine, the rear window is most suitable for carrying antennas.

When developing rear-window antennas, the rear-window heater structure has a shape and dimensions given by the engineering and design aspects specific to each type of vehicle, which should be thoroughly investigated.

A dual-antenna structure on the rear window for use with diversity systems is proposed in EP 0065263. This arrangement consists of a primary antenna placed in a section of the window that is free of heater wires and a secondary antenna the signal of which is tapped in a suitable way at the lowermost wire of the heater structure.

However, such a configuration has several drawbacks: it is not suitable for use with windows where the entire glass surface is covered by the heater structure; the additional amount of air pressure introduced by the primary antenna is undesirable due to specific design constraints; the receiving performance of the primary antenna with FM radio signals on circularly or vertically waves is unsatisfactory, as the vertical dimension of the area not covered by the heater structure is insufficient.

A dual-antenna configuration on a single window is also proposed in DE 3220279. This arrangement features multiple antenna signal taps with small intermediate spacing.

If used with a diversity system, such an arrangement yields good results in regions with minor differences in the propagation delays of the wave portions involved and low resulting multipath distortion. In regions where propagation is less straightforward and where substantial differences in propagation delay exist (e.g. mountainous areas), however, such an arrangement has major disadvantages compared with two single antennas with a larger spacing between their tap points. For the above-mentioned reasons, the receiving performance of a configuration according to DE 3220279 is also unsatisfactory for circularly or vertically polarized waves.

SUMMARY OF THE INVENTION

The invention was based on the requirement to make a heater structure of a given shape suitable for use as a diversity system with at least two antennas. Further requirements were that the mean reception quality achievable with each of the antennas be as good as possible and that the coincidence of interferences occurring on both (or all) antennas under road conditions be as low as possible.

RF isolation is given if the received signals are different especially with regard to radio interference phenomena, such as rapid decreases in signal level.

Application examples based on the invention are shown in the drawings listed below and will be explained in more detail.

BRIEF DESCRIPTION OF THE DRAWINGS

FIG. 4: shows a graph for approximation of level characteristics by means of two slightly displaced curves:

$$U(x) = U_{max} * \sqrt{(\sin \beta x)^2 + (m * \cos \beta x)^2}$$

and resulting interference characteristics of individual antennas and of a diversity system

DESCRIPTION OF THE PREFERRED EMBODIMENTS

The invention utilizes the state-of-the-art rear window designs largely in use with motor vehicles now, i.e. either a printed heater structure on the glass surface or heater wires embedded in laminated glass. Heater wires usually form a horizontal structure with one bus bar each on the right and left edges of the window. It is common knowledge that such heater structures are very suitable for use as receiving elements of single antennas. As a rule, this requires that the antenna be active in order to yield a receiving performance equivalent to that of a standard rod antenna. In the following, antennas according to the invention will be discussed using the printed heater structure as an example. Structures with embedded heater wires have to be designed accordingly.

The invention was based on the requirement to leave the design of the heater structure on the rear window largely unmodified in order to create two or more antennas, that is not to introduce any additional printed conductors, but to achieve the required difference in signal level over time presented by the individual antennas using another appropriate method, which will be discussed in the following. It is a point of major importance to carefully investigate rapid decreases in signal level. Besides causing sudden noise bursts in the receiving system, these phenomena inevitably result in distortion of the demodulated signal, especially with mobile reception of frequency-modulated signals. This distortion can not be corrected by the receiving system.

Figure 1:
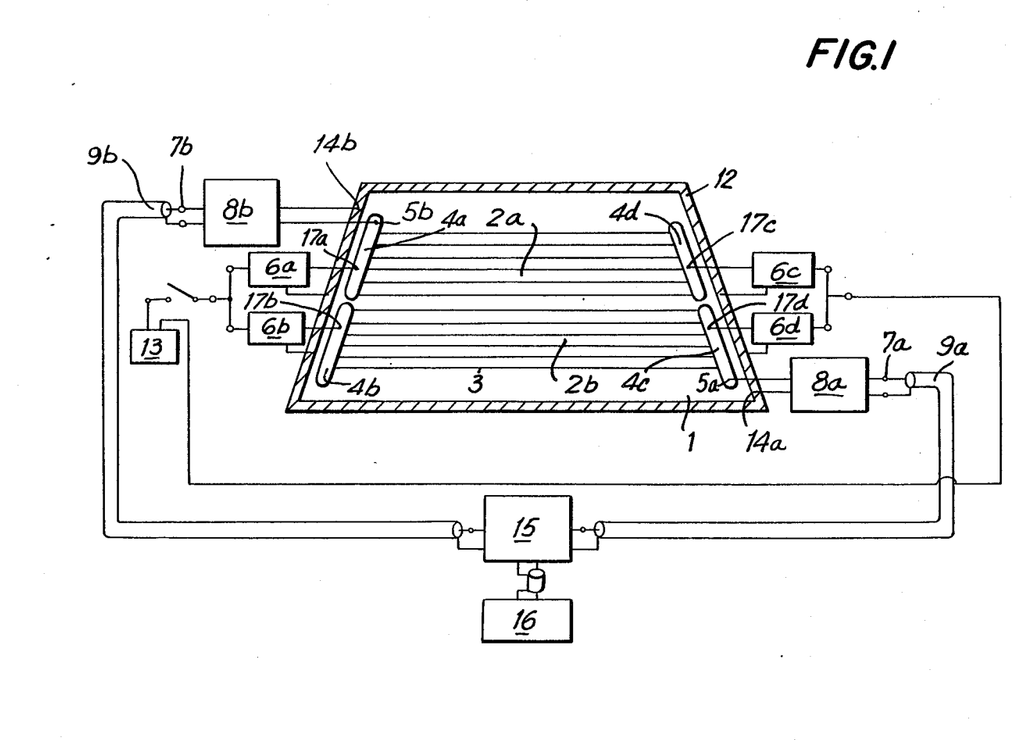
FIG. 1: shows a diversity antennas based on the invention using two-section heater structure divided at center line, two diagonally opposite tap points, a diversity switching unit and a receiver.

FIG. 1 shows a principal configuration of two antennas based on the invention for FM radio band applications. The rear window 1 surrounded by the highly conductive frame 12 is equipped with the printed heater structure 2. The example FIG. 1 shows a heater structure divided in two sections 2a and 2b by splitting up the bus bars 4 into two almost equal sections. The heater DC supply to the four bus bars 4a through 4d is routed through the four supply networks 6a through 6d. The heater wires are designated 3. The tap points 5a and 5b serve to pick up the received signals. They are located at two carefully selected points on the bus bars. With the example in FIG. 1, the tap point locations are at the upper end of the left bus bar and at the lower end of the right bus bar. The received signals are routed through the feeder networks 8a and 8b, passed over to the antenna connection points 7a and 7b and to the coaxial feeder cables 9a and 9b which go to the diversity switching unit 15. The diversity switching unit constantly switches the antenna providing better signal quality to the receiver.

Figure 2:
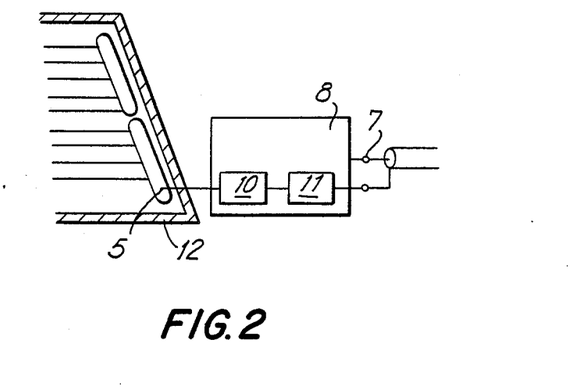
FIG. 2: shows a layout of feeder networks used with active antennas

If the antennas are passive, the feeder networks consist of reactive components which provide impedance over the desired frequency range to match the characteristic impedance of the coaxial cables used. If the antennas are active (see FIG. 2), a network 10 is inserted between the tap point 5 and the active circuit 11. This network interacts with the active circuit 11 in order to optimize the signal-to-noise ratio over the desired frequency range at the antenna connection point 7. The supply networks 6a through 6d mainly serve to route the DC current to the heater structure. With diversity antennas based on the invention, however, they are also used to properly and accurately adjust the AC load on the bus bars over the desired frequency range. Together with the location chosen for the tap points, the AC load on the bus bars by the supply networks 6 influences the receiving performance and the difference in rapid signal level decreases over time of the individual antennas. Therefore, it is of major importance for the entire diversity system to work properly that the AC load on the bus bars be appropriately selected.

In order to judge the suitability of two antennas for diversity applications, it is good practice to consider the correlation factor between the signal characteristics under road conditions of the antennas under investigation (see ANDERSEN) or the difference in radiation patterns determined on an antenna test range (see BOSSERT). When applying these criteria to diversity antennas based on the invention, it becomes obvious that the typical correlation factor between the signals provided by such antennas is much beyond +0.5 and that the radiation patterns of such antennas do not basically differ in the way BOSSERT claims them to do. Nevertheless, the use of antennas based on the invention with a diversity system can yield substantial improvements of receiving performance.

Figure 3:
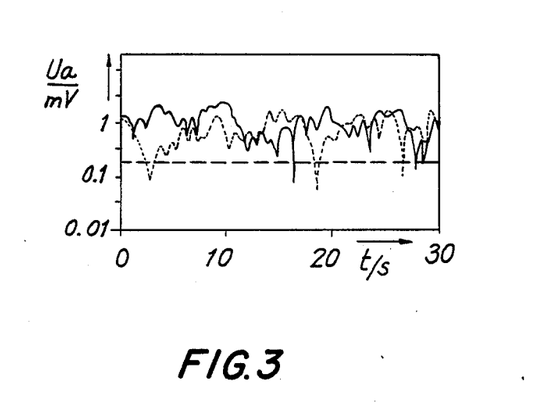
FIG. 3: shows a level diagram of two antennas under road conditions

This is based on the fact that the correlation factor is determined for the entire duration of the measurement, while the improvements of receiving performance achievable by means of a diversity system depend on extremely short periods, i.e. the periods during which interference is present on one of the antennas. FIG. 3 shows typical level characteristics under road conditions of two antennas based on the invention in a configuration as shown in FIG. 1. In practical operation, interference only occurs with rapid decreases of signal level. This applies equally to all interference phenomena encountered with FM broadcasting at metric waves, such as noise bursts, multipath distortion, adjacent- and co-channel interference as well as intermodulation.

It is common knowledge that the rapid decreases of signal level and the associated deterioration of signal quality are caused by a vector addition at the receiving location of the partial waves coming from the broadcast transmitter and superimposing with different amplitude, phase and propagation delay. Even if the mean received level of the desired signal is substantially higher than the internal noise level of the receiving system and the mean level of adjacent- or co-channel interference, it often occurs in practical applications that the level of the desired signal merges in the noise floor, as it is subject to variations of 20 to 30 dB over distances of only a few meters covered by the vehicle. This results in serious deterioration of signal quality.

If the partial waves carrying the wanted signal present large differences in propagation delay, this will result in additional multipath distortion. This is due to the fact that the partial waves have different instantaneous frequencies which produces peaks of unwanted frequency deviation containing spectral components not integral to the original modulating signal. These interference phenomena are only encountered with rapid decreases of signal level, too.

FIG. 3 shows a typical portion of a level characteristic of two antennas based on the invention. The additional line at $-14$ dB$\mu$V marks the minimum level required for an acceptable signal-to-noise ratio. It is obvious that there is no situation where both antennas operate below this level at the same time.

Figure 4:
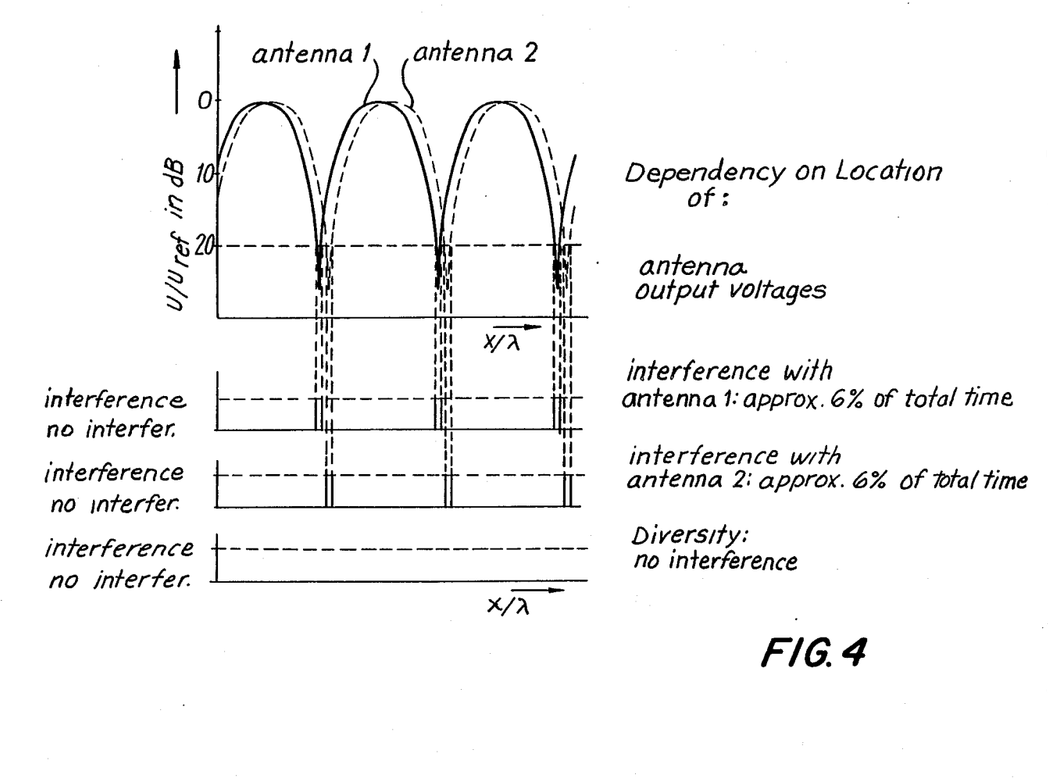

The curves shown in FIG. 4 are approximations of the level characteristics obtained by measurements under road conditions. The curves are described by the function:

$$U(x) = U\text{max} * \sqrt{(\sin \beta x)^2 + (m * \cos \beta x)^2}$$

According to MEINKE I, this voltage characteristic is the one resulting on a mismatched line, where m is the inverse VSWR. In practical applications, such a characteristic is also encountered in a wave field if a plane wave propagating in a direction "x" is superimposed by a wave with equal frequency but opposite direction of propagation, e.g. in case of reflection on a conducting surface associated with some loss. If a vehicle carrying two antennas at a definite intermediate spacing moves in such a wave field, the output voltages produced by both antennas will basically present the characteristic shown in the diagram. In case of an intermediate spacing of only 1/24 wavelengths (which is equal to 15 degrees) as shown in FIG. 4, the correlation factor for both antennas is approximately 0.84 with a level deviation range of 26 dB, which is normally considered totally insufficient for diversity applications. However, when considering the periods during which interference is present, it is obvious that interference never occurs on both antennas at the same time. Thus, interference is completely eliminated in a diversity system.

The application of measurement methods that allow to obtain information on the probability of simultaneous interference occuring on several antennas under road conditions shows that antennas based on the invention are more favourable than expected for use within diversity antenna systems.

Therefore, finding the optimum location of the tap points and the optimum layout of the supply networks 6 requires a mobile test setup with a receiver which must be able to synchronously registrate the modulation distortion occuring with all antennas under test and make it available for evaluation. The recorded results will then allow for judging and optimizing the efficiency of the antennas under test and their suitability for diversity applications.

Such tests are time-consuming, as the huge number of configurations of tap points 5 and supply networks 6 based on the invention requires extended road tests.

Experience, however, has shown that optimizing antennas according to the invention does not result in substantially different configurations of tap points 5 and supply networks 6. With present state-of-the-art rear windows, high-quality diversity antennas are generally obtained by using one of the embodiments of the invention.

In order to keep the probability of simultaneous interference on both diversity antennas as low as possible, that is to obtain maximum suitability for diversity of both antennas, it is generally favourable to provide a large spacing between the tap points $5a$ and $5b$ on the bus bars, to divide the heater structure into the sections $2a$ and $2b$ and to use these sections as receiving structures for the two antennas. When used in a diversity system, this configuration (see FIG. 1) generally provides good reception quality on vehicles with both large and small rear windows or large and small heater structures, provided the supply networks $6a$ and $6b$ be appropriately chosen according to the invention.

Furthermore, recommendations can be made for the appropriate choice of supply network impedances ($6a$ through $6d$) over the desired frequency range presenting the respective load impedances for the bus bar sections $4a$ through $4d$.

Here, a distinction has to be made whether this is a supply network connected to a bus bar which again has a tap point connecting it with a feeder network (e.g. supply networks $6a$ and $6c$, tap points $5b$ and $5a$ and bus bar sections $4a$ and $4c$) or a supply network connected to one of the other bus bar sections which do not have a tap point (e.g. supply networks $6b$ and $6d$ and bus bars $4b$ and $4d$).

As the antenna structures intercept RF energy over a certain surface area, it is possible to influence the way the differential wave portions superimpose at the tap points $5b$ and $5a$ by adequately modifiying the load on the bus bars $4b$ and $4d$ presented by the supply networks $6b$ and $6c$. Therefore, the difference in receiving characteristic of the two antennas may be influenced by adequately selecting the supply networks. Additionally, the source impedance at both tap points $5a$ and $5b$ largely depends on the AC load of the respective opposite bus bar, as the impedances of opposite bus bars are tightly coupled by the heater wires interconnecting them.

For antennas based on the invention, the AC load on the bus bars without the tap points $5a$ and $5b$ is of major importance. Besides of the most straightforward approaches to the supply networks $6b$ and $6c$ which provide either a no-load or short-circuit condition, it seems also advisable to investigate low-resistance or high-resistance inductive or capacitive loads in order to achieve the desired performance. Further recommendations relative to the design of the supply networks $6b$ and $6c$ are given further below. Other physical constraints and design aspects apply for the supply networks $6a$ and $6d$ which are connected to the bus bars carrying the tap points $5a$ and $5b$. Here, the AC load on the bus bars has very little influence on the way the differential excitations of the two heater sections superimpose, since the load occurs on the same bus bar section and in the vicinity of the tap point $5a$ or $5b$, respectively. It is well understood that the bus bar sections are low-resistance DC conductors in the vicinity of the window frame which do not accept any significant portions of RF energy.

An extreme case would be given by directly connecting the supply networks $6a$ and $6d$ to the tap points $5a$ and $5b$ of the feeder networks. Here, the influence of the AC load would be reduced to a transformation of the source impedance of the antenna structure, while the invention would experience some improvement by a reduction of the number of tap points on the bus bars and the associated manufacturing costs.

Generally, the supply networks $6a$ and $6d$ will be designed such that they present negligible AC load with respect to the tap points $5a$ and $5b$. This can e.g. be achieved by inserting a high-resistance choke into the heater current leads. However, this method has some serious drawbacks due to the large amount of current of up to 30 A drawn by the entire heater structure (or 15 A by each section), as the resistive losses integral to the choke would lead to excessive dissipation of heater power or would require a totally oversized choke.

Figure 5A:
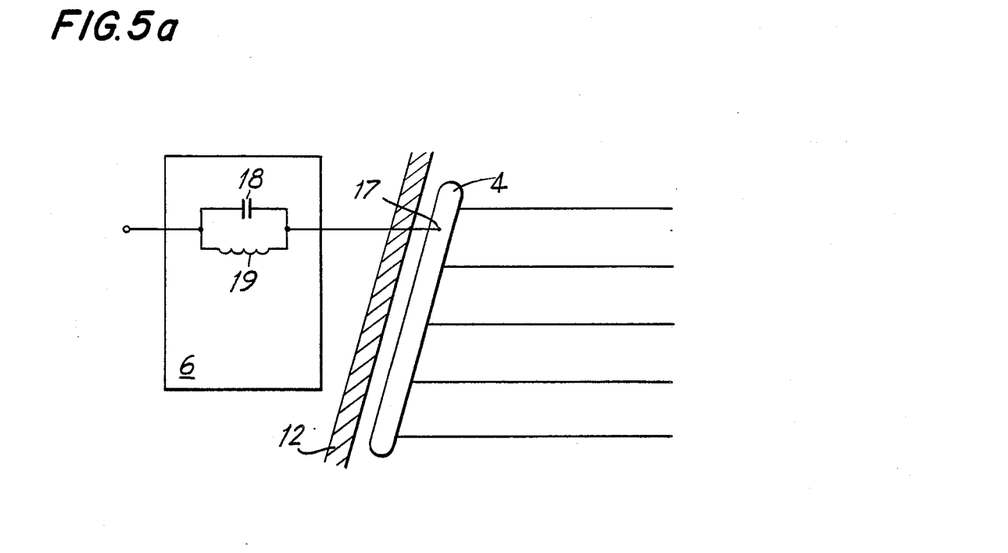
FIG. 5: shows a favourable supply network circuitry approaches

A parallel resonant circuit as shown in FIG. 5, with its resonance frequency in the FM radio band, is a much more elegant and advantageous solution in this case. As the absolutevalue impedance is theoretically infinite at resonance, a component with minimum inductance may be selected such that both the power dissipation and the size of the choke can be kept very low. The high resistance required for the resonant circuit depends on the resistance of the source impedance of the antenna structure. In practical applications, the capacitance of the capacitor connected in parallel ranges between 5 and 25 pF, such that the AC load in the 87 to 108 MHz FM radio band is never lower than 1450 or 290 Ohms and the inductance never exceeds values of 0.1 or 0.5 $\mu$H, respectively.

Frequently, the heater DC current contains interfering currents at RF frequencies generated by the ignition system of the engine and tending to produce radio frequency interference in the receiving system by spectral portions falling on the FM radio band. It is generally sufficient to add a filter capacitor (20) to the supply networks in order to reduce this interference to the required amount. This capacitor must be connected to chassis from the far end of the resonant circuit remote from the bus bar in order to short-circuit these frequency portions to ground.

Figure 6:
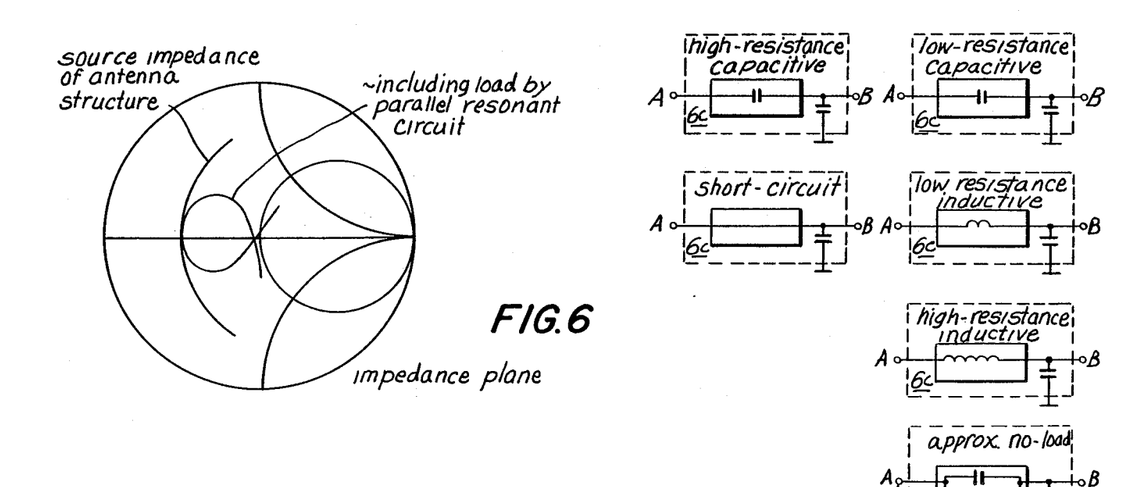
FIG. 6: shows a impedance characteristic for the source impedance, shown with and without suitable load by supply network

The use of such a capacitor (20) leads to well-defined impedance characteristics at the far end of the resonant circuit remote from the bus bar. Additionally, such a capacitor allows for a further advantageous configuration of the invention where the resonant circuit consisting of the components (18) and (19) can be built up with lower resistance and lower loss if the AC load on the bus bars is desired to be equal to the characteristic impedance of the parallel resonant circuit with respect to the tap points 5a and 5b in order to achieve suitable transformer or—if required—amplifier properties of the feeder networks 8a and 8b. In general, this is the case if the source impedance of the antenna structure has the characteristic of a series resonant circuit (see FIG. 6), such that a broadband transformation is obtained by loading this impedance with a parallel resonant circuit of the same resonance frequency connected in parallel. This may lead to a simplification of the feeder networks 8a and 8b.

Figure 5B:
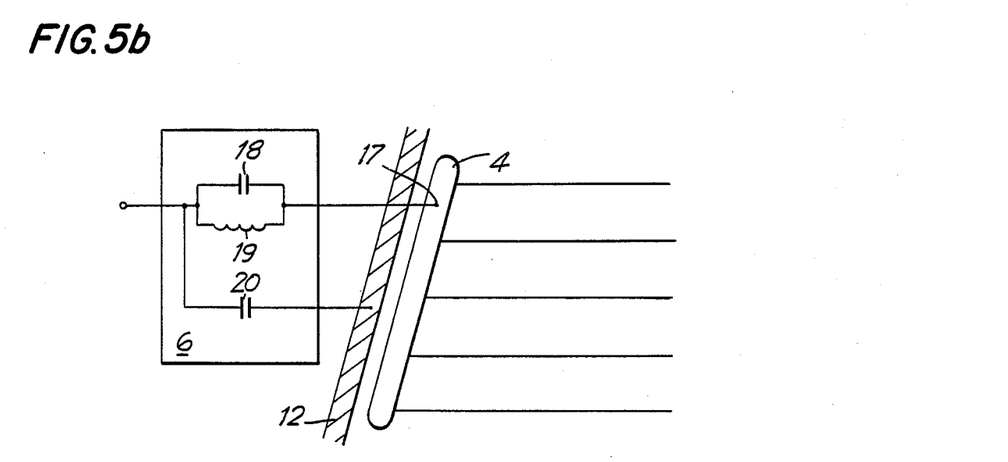

The supply networks 6b and 6c can also be simply and elegantly realized using the basic circuit configuration shown in FIG. 5b. This configuration allows for arbitrarily adjusting high-resistance or low-resistance inductive or capacitive loads for the bus bars 4b and 4d if the components (18) and (19) are properly selected.

Figure 7:
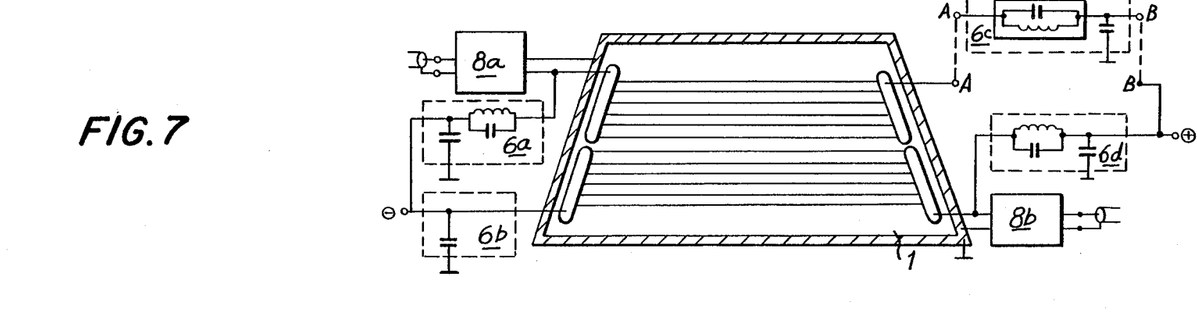
FIG. 7: shows a favourable dual-antenna diversity approach based on the invention shown with set of six supply networks minimizing loss of signal quality due to rapid decrease of signal level

For low-resistance inductive loads it is advantageous to leave the capacitor (18) away. For low-resistance capacitive loads, however, the inductor (19) is absolutely necessary as the circuit must be able to pass DC. In order to create an AC short-circuit condition, the components (18) and (19) may be replaced by a direct interconnection between the connection point of the supply network on the bus bar section and the filter capacitor (20). In order to create a no-load condition for AC, the aspects discussed above have to be applied accordingly when designing the supply networks 6a and 6d. When determining the optimum AC load on the bus bar sections 4b and 4d, it is generally possible to arbitrarily select the load presented by one of the supply networks 6b and 6c, e.g. by opting for a short-circuit condition which is fairly easy to realize. With the example shown in FIG. 7, the bus bar section 4b has a capacitor connected to ground, while the bus bars 4a and 4c with their tap points 5a and 5b are almost unloaded due to the resonant circuits tuned to midband frequency in the supply networks 6a and 6d.

The optimum circuit configuration must then be determined by varying the load on the other bus bar section (section 4d with the example) in 6 to 8 steps from no-load to inductive, via shortcircuit and capacitive to no-load condition and by recording the performance with a diversity system for one frequency each at the lower end, the center and the upper end of the FM radio band using the test setup described above.

If the results prove to be unsatisfactory, the peripheral circuitry of one bus bar (section 4b with the example in FIG. 7) should be modified to obtain e.g. a no-load condition and the measurements should be repeated with varying loads on the bus bar 4d. As a general rule of thumb, the period during which interference is present on one of the two individual antennas should be shortened to approximately 1/5 or even down to 1/20 by the diversity system.

With several types of vehicle, this method may also yield a good impedance isolation between the tap points 5a and 5b, additionally simplifying adjustment of the feeder networks, as the source impedance e.g. at the tap point 5a is almost independent of the peripheral circuitry of the tap point 5b.

There are several causes for coupled impedances. On the one hand, capacitive coupling exists between the heater sections, on the other hand, coupled impedances are inherent to a design with two antenna structures placed on a single window and occur due to the currents and voltages present on the metal frame of the body surrounding the window. Furthermore, direct coupling is introduced if the heater structure is not divided in two sections (see FIG. 9), as the lateral bus bars are not subdivided either.

However, such a good impedance isolation need generally not be provided since it is general knowledge that a matched condition can be achieved on both sides of a four-terminal network. This requires a mathematical analysis of the entire four-terminal matrix where the terminal pairs of the network are represented by the terminal pairs of the two diversity antennas, i.e. the tap points 5a and 5b and their associated ground connection points.

Figure 8:
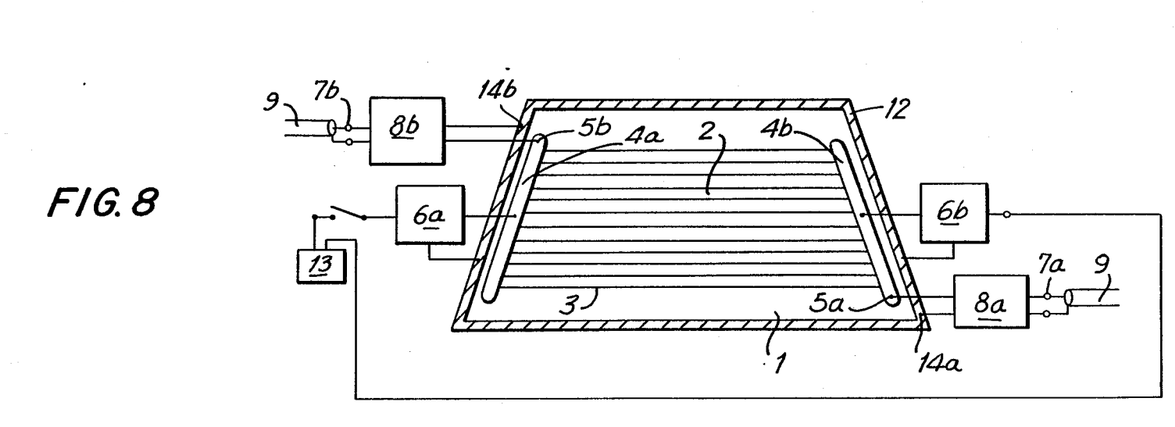
FIG. 8: shows a schematic of diversity antennas based on the invention using undivided heater structure and two diagonally opposite tap points

FIG. 8 shows a further antenna configuration based on the invention where the tap points are located at diagonally opposite ends of the bus bars like in FIG. 1, but where the heater structure remains undivided. This configuration has the advantage of requiring only a minimum amount of peripheral circuitry at the rear window. On the other hand it renders very little possibility to influence the diversity behaviour of the two antennas with respect to rapid decreases of signal level by varying the supply networks 6a and 6b. Consequently, this configuration yields the good results required for diversity mainly in such cases where the optimum circuitry of the networks 6a and 6b consists of highly resistive components, which is mandatory in this configuration if you want to avoid impairments of receiving performance of the individual antenna structures. Due to the direct coupling existing between the tap points, impedance isolation is normally very poor.

Figure 9:
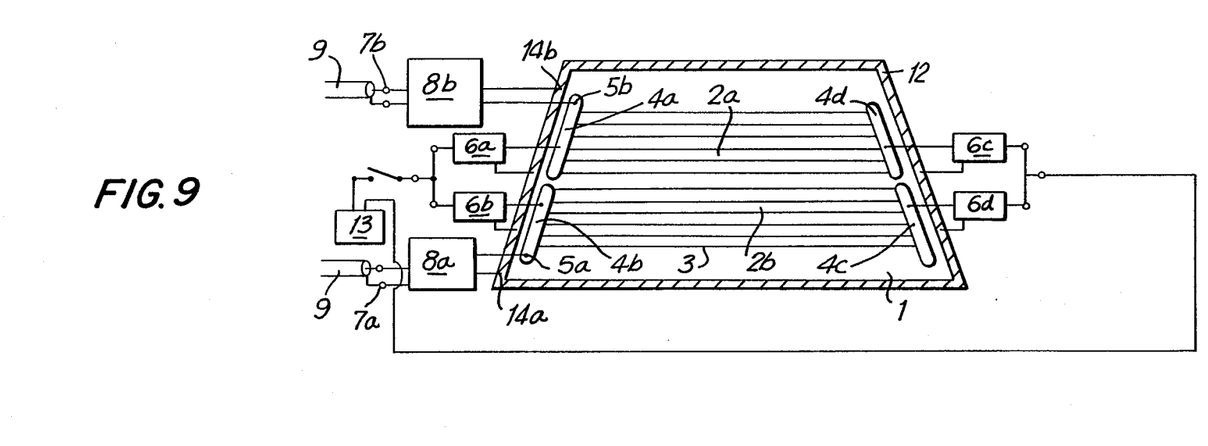
FIG. 9: shows a schematic of diversity antennas based on the invention using two-section heater structure divided at center line and two tap points on both sides of the window

FIG. 9 shows an antenna configuration based on the invention where the feeder networks 8a and 8b are mounted on the same side of the rear window. This has the advantage of resulting in a more favourable cable run from the feeder networks to the diversity switching unit. Normally, sufficient difference in antenna behaviour with regard to rapid decreases of signal level at the tap points (5a and 5b) requires the heater structure to be divided in two equal sections. Despite the reduced spacing between the tap points 5a and 5b as compared to FIG. 1, equivalent results are normally achieved. An acceptable diversity performance usually requires different circuitry on the supply networks 6c and 6d peripheral to the bus bars 4c and 4d. When optimizing the system according to the invention, it usually shows that one impedance should have relatively few resistive components while the other one should have relatively large resistive components.

Figure 10:
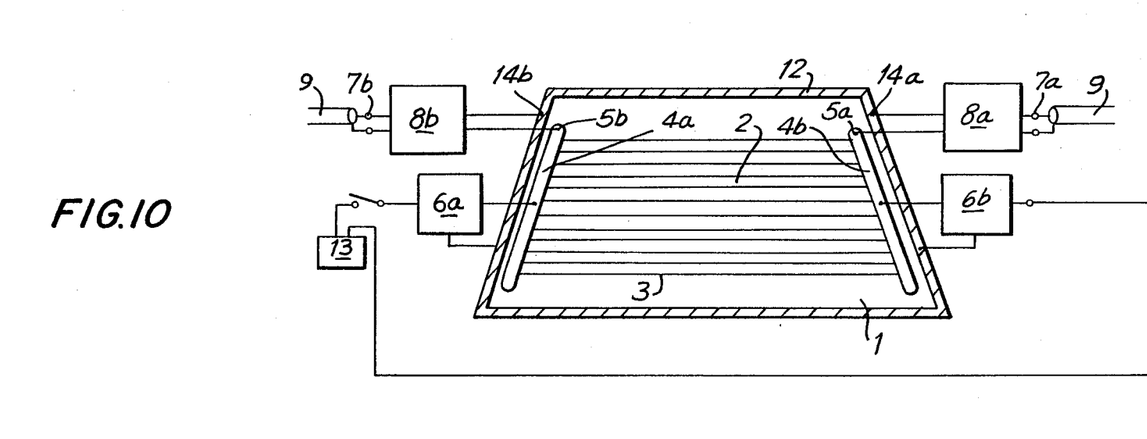
FIG. 10: shows a diversity antennas based on the invention using undivided heater structure and two tap points at upper ends of bus bars

FIG. 10 shows an undivided heater structure where the tap points (5a) and (5b) are located on the upper or lower ends of the two bus bars. With some vehicles, e.g. those with a top-hinged rear door, this provides the advantage of a very simple cable run. For information on the suitability of this structure for diversity applications and specifically on the design of the supply networks 6a and 6b, refer to the above explanation of FIG. 8.

Figure 11:
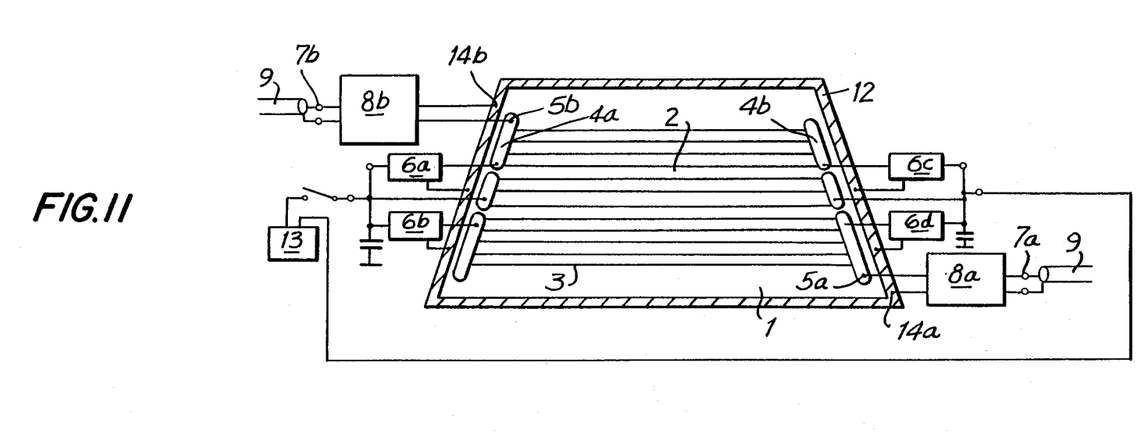
FIG. 11: shows a schematic of diversity antennas based on the invention using three-section heater structure with two tap points each at upper, lower and center heater sections

FIG. 11 shows a further antenna configuration based on the invention. The heater structure is divided into three sections. The center section is not used as an antenna, but is connected to ground through a capacitor in order to reduce the capacitive coupling between the two upper and lower heater sections that do serve as antennas. The center heater section should preferably be somewhat smaller than the other ones.

Normally this measure is of less importance for the diversity performance with regard to significant decreases of signal level occuring on the individual antennas, but it improves the impedance isolation between tap points 5a and 5b which helps to ease proper adjustment of the feeder networks. This is true in the same way for diagonally opposite tap points as well as for tap points located on the same side of the rear window.

Obviously, the efficiency of a diversity antenna system increases markedly with the number of antenna structures used, provided that the individual structures present sufficient difference in behaviour with respect to rapid decreases of signal level. It is therefore recommended to have e.g. four of such antenna structures based on the invention on a single rear window.

Figure 12:
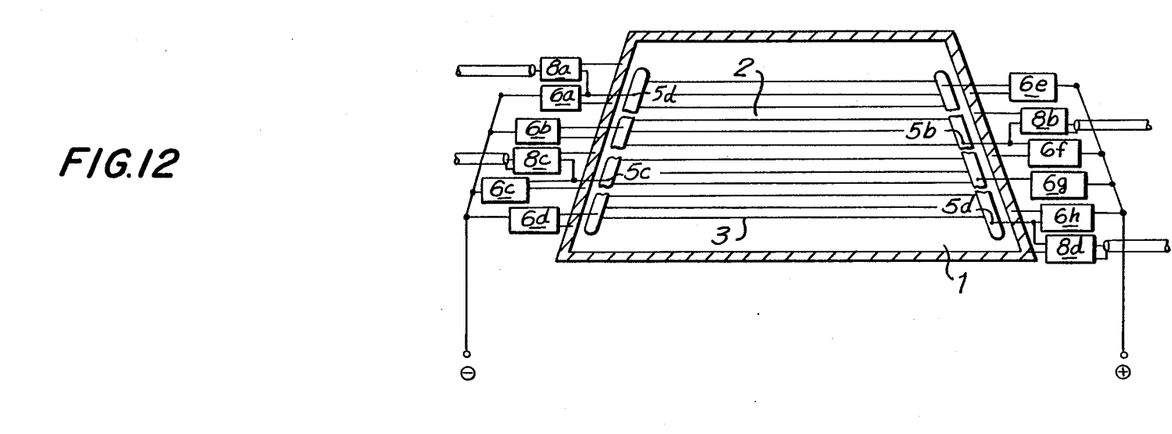
FIG. 12: shows a schematic diversity antennas based on the invention using four-section heater structure with one tap point at each of the heater sections

FIG. 12 shows another useful application of the invention with four diversity antenna structures obtained by dividing the heater structure into four sections. Thereby, we obtain eight bus bar sections with the tap points 5a to 5d located in turn right and left on the window. The load impedances of the four supply networks 6b, 6d, 6e and 6g on the bus bar sections 4b, 4d, 4e and 4g opposite to the tap points 5a through 5d can be determined by means of the road tests described further above while the load impedances presented by the supply networks 6a, 6c, 6f and 6h should be generally highly resistive for the reasons laid down in the section on FIG. 1.

Figure 13:
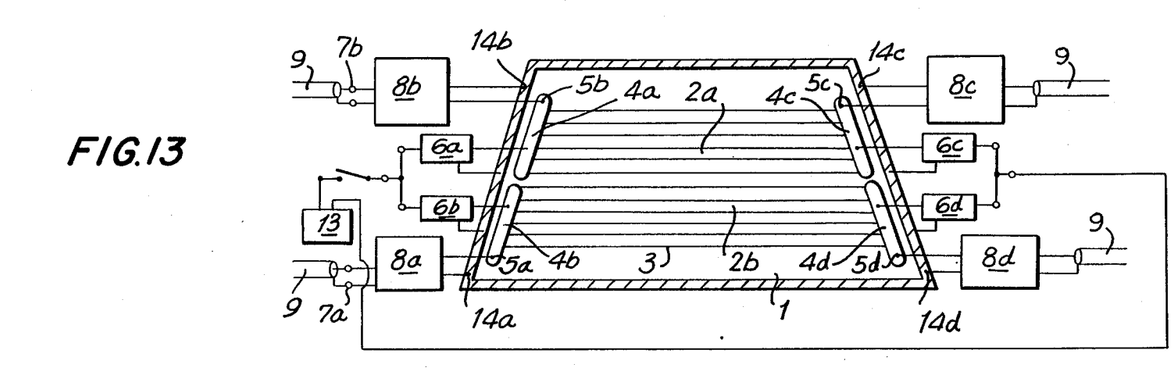
FIG. 13: shows a schematic of diversity antennas based on the invention using two-section heater structure divided by center line with four tap points on both sides of the window

FIG. 13 shows a further application where the heater structure is horizontally divided in two sections, each of the two sections having two tap points (5) on their lateral bus bars. This configuration, if it is to show the desired diversity behaviour of the individual structures with regard to rapid decreases of signal level, requires a well-sized rear window. This is usually encountered in vehicles with a large rear door where the vertical dimension of the heater sections are sufficient such that the system can be optimized to a certain extent by using the appropriate networks (6). The margin left for such optimization being relatively narrow, this rather specialized configuration (compare FIG. 12) will be used mainly if the geometry of the rear window and the heater structure requires the peripheral circuitry to be highly resistive. In such cases, however, a far simpler construction may be used for the four diversity antennas.

The reception of long-, medium and short-wave AM requires only a single antenna on account of the large wavelengths involved. This antenna may e.g. be an element apart from the heater structure and be placed above or below it, used in combination with a high-resistance input antenna amplifier in state-of-the-art technology. Transformer coupling to one of the heater sections might also be considered as a state-of-the-art approach in this case.

We claim:

1. A diversity antenna configuration for a motor vehicle, comprising:
   at least two diversity antennas operating with a same receiving frequency and switchable to operate alternatingly and each having a window-mounted heater structure (2a, 2b) and a feeder network (8a, 8b), said heater structure including bus bars (4a, 4d; 4b, 4c) and conductive heater sections (2a, 2b) extending between the bus bars;
   at least a pair of terminals electrically connected to each of the feeder networks (8a, 8b), the terminals including a conductive tap (5a, 5b) on a respective one of the bus bars (4a, 4b) and including a grounded connection (14a, 14b), the taps being substantially isolated from each other with respect to radio frequencies;
   DC power leads extending to the bus bars; and
   RF taps (6a–6d) in the DC power leads.

2. Diversity antenna configuration according to claim 1, and further comprising:
   a grounded window frame (12), the diversity antennas being built up using the heater structure (2), the bus bars (4a to 4d) having at least two of the taps (5a, 5b) at different locations so as to form terminal pairs (5a, 14a, 5b, 14b) together with the ground connections (14a, 14b), the ground connections (14a, 14b) being located adjacent to the two taps (5a, 5b) on the window frame (12), each of the terminal pairs being connected with a respective one of the feeder networks (8a, 8b), the feeder networks having an output constituting a respective antenna connection (7a, 7b) of each diversity antenna, the RF traps constituting supply networks (6a to 6d) which pass the heater current and form a low-loss RF impedance between the bus bar (4a to 4d) and the grounded window frame (12).

3. Diversity antenna configuration according to claim 2, wherein the tap points (5a, b) and the RF impedance of the networks (6a to 6d) in the DC power leads to the bus bars (4a to 4d) are formed to minimize the coincidence of rapid decreases of signal level occurring on all antenna connection points (7a, 7b) under road conditions.

4. Diversity antenna configuration according to claim 2, wherein the feeder networks are formed to have transformer properties.

5. Diversity antenna configuration according to claim 2, wherein the feeder networks are formed to have amplifier properties.

6. Diversity antenna configuration according to claim 2, wherein the feeder networks are formed to have transformer and amplifier properties.

7. Diversity antenna configuration according to claim 1, wherein the feeder networks (8a, 8b) have antenna connection areas (7a, 7b), the RF traps constitute supply networks (6a–6d), the taps (5a, b) and the supply networks (6a–6b) providing RF impedances in the DC power leads to the bus bars (4a to 4d) so as to minimize a coincidence of rapid decrease of signal level occuring on all the antenna connection areas (7a, 7b) under road conditions.

8. Diversity antenna configuration according to claim 1, wherein the heater structure is divided horizontally in two sections of almost equal size, the heater sections (2a and 2b) being isolated from each other over the frequency range with respect to the DC power leads, each of the heater sections (2a and 2b) having one of the taps (5a and 5b), the taps being located diagonally opposite each other at diagonally opposite ends of the bus bars (4c, 4a).

9. Diversity antenna configuration according to claim 1, wherein the heater structure has sides and is divided horizontally in two sections so that each has a terminal side at which are a respective one of the terminals (8a, 8b), the heater sections (2a and 2b) being isolated from each other over the frequency range with respect to DC power leads at least on the respective terminal side, two (5a and 5b) (5a and 5b) taps being located at an end of each of the bus bars (4c, 4a) on one of the sides of the heater structure.

10. Diversity antenna configuration according to claim 1, wherein the heater structure (2) is undivided and has two of the tap points (5a and 5b) located at diagonally opposite ends of the two bus bars.

11. Diversity antenna configuration according to claim 1, wherein the bus bars extend vertically so as to have an upper end, the heater structure (2) being undivided and having two of the taps (5a and 5b) located at the upper end of the respective bus bar (4a, 4b).

12. Diversity antenna configuration according to claim 1, wherein the heater structure is subdivided horizontally into three heater sections so as to have two outer heater sections and a central heater section between the two outer heater sections, the taps (5a and 5b) being respectively located on each of the outer heater sections, the central section having a peripheral circuitry for the frequency range.

13. Diversity antenna configuration according to claim 12, wherein the central heater section is defined by a vertical dimension that is smaller than that of the outer heater sections.

14. Diversity antenna configuration according to claim 1, the heater structure (2) is subdivided horizontally into four almost equal sections (2a through 2d), all four sections (2a through 2d) being isolated from each other with respect to their DC power leads for the desired frequency range, each section (2a through 2d) having a tap point (5a through 5d).

15. Diversity antenna configuration according to claim 1, wherein the RF traps constitute supply networks (6a, 6d), the supply networks in the DC power leads to the bus bars (4a, 4c) with the taps (5b, 5a) being formed to have a high-resistance, low-loss RF impedance.

16. Diversity antenna configuration according to claim 15, wherein the high-resistance RF impedance in each of the supply networks (6a through 6d) consists of a parallel resonant circuit (18, 19) with a resonance frequency inside the frequency range.

17. Diversity antenna configuration according to claim 1, wherein the RF traps constitute supply networks (6a, 6d), at least one of the supply networks (6b, 6c) in the DC power leads to the bus bars (4b, 4d) without the taps (5b, 5a) is formed to have a high-resistance, low-loss RF impedance.

18. Diversity antenna configuration according to claim 17, which in at least one of the supply networks (6b, 6c) in the DC power leads to the bus bars (4b, 4d) without the tap points has a capacitive low-loss impedance over the desired frequency range.

19. Diversity antenna configuration according to claim 17, wherein the highresistance RF impedance in each of the supply networks (6a through 6d) consists of a parallel resonant circuit (18, 19) having a resonance inside the desired frequency range.

20. Diversity antenna configuration according to claim 17, wherein at least one of the supply networks (6b, 6c) in the DC power leads to the bus bars (4b, 4d) without the taps has an inductive low-loss impedance over the desired frequency range.

21. Diversity antenna configuration according to claim 1, wherein the RF traps constitute supply networks (6a–6d), at least one of the supply networks (6b, 6c) in the DC power leads to the bus bars (4b, 4d) without the taps (5b, 5a) being formed to have a low-resistance, low-loss RF impedance over the frequency range.

22. Diversity antenna configuration according to claim 21, and further comprising:
   a ground (12), each of the supply networks having a resonant circuit (18, 19) with a side remote from the respective bus bar (4b, 4d) and with a resonance frequency inside the desired frequency range, the one supply network (6b, 6c) being formed with a capacitor (20) producing the low-resistance, lowloss high frequency impedance, the capacitor (20) leading to the ground (12) from the side of the resonant circuit (18, 19) that is remote from the respective bus bar (4b, 4d).

23. Diversity antenna configuration according to claim 1, wherein the feeder networks are formed as active networks, the active networks (8a, 8b) having input impedance rates formed so that the active networks minimize absorption of RF power by the terminals (5a, 14a; 5b, 14b).

24. Diversity antenna configuration according to claim 23, wherein the active networks (8a, 8b) have a high-resistance input impedance compared to a impedance that can be measured on the terminal pairs (5a, 14a; 5b, 14b).

25. Diversity antenna configuration according to claim 24, wherein the active networks (8a, 8b) have inputs with a capacitive, high-resistance amplifier component.

26. Diversity antenna configuration according to claim 25, wherein the component is formed as a field effect transistor.

27. Diversity antenna configuration according to claim 1, wherein the heater sections (2a, 2b) consist of single wire conductors.

28. Diversity antenna configuration according to claim 1, wherein the heater sections (2a, 2b) are built up using a resistive layer.

29. Diversity antenna configuration according to claim 1, wherein the bus bars extend vertically so as to have a lower end, the heater structure (2) being undivided and having two of the taps (5a and 5b) located at the lower end of the respective bus bar (4a, 4b).

30. Diversity antenna configuration according to claim 1, wherein each of the bus bars have a total of four outer ends, the terminals including four terminals with four taps respectively located on the outer ends of the bus bars.

31. A diversity antenna configuration for a motor vehicle, comprising:
   means for receiving radio frequency signals and for generating heat and including at least two diversity antennas operating with a same receiving frequency and switchable to operate alternatingly and formed with a heater structure, the heater structure including bus bars and heater sections extending between the bus bars;
   means for picking up the received radio frequency signals and including taps, the taps being arranged on the bus bars and substantially isolated from each other with respect to radio frequencies;
feeder networks for routing the picked up radio signals from the taps;
adjusting means for adjusting an AC load on the bus bars over a frequency range; and
supply means connected with the adjusting means for supplying a current to the bus bars to adjust a receiving performance and decrease a signal level over time of the two diversity antennas individually.

* * * * *